(12) United States Patent
Jäger et al.

(10) Patent No.: US 7,090,447 B2
(45) Date of Patent: Aug. 15, 2006

(54) TWIST DRILL FOR DRILLING WITH A COUNTERSINK CUTTING ARRANGEMENT, AND A CUTTING TOOL WITH A COUNTERSINK CUTTING ARRANGEMENT, AND A CUTTING-CHAMFERING TOOL

(75) Inventors: Horst Jäger, Nürnberg (DE); Berthold Zeug, Fürth (DE)

(73) Assignee: Kennametal Inc., Latrobe, PA (US)

( * ) Notice: Subject to any disclaimer, the term of this patent is extended or adjusted under 35 U.S.C. 154(b) by 382 days.

(21) Appl. No.: 10/617,519

(22) Filed: Jul. 11, 2003

(65) Prior Publication Data

US 2004/0057804 A1   Mar. 25, 2004

Related U.S. Application Data

(63) Continuation-in-part of application No. PCT/EP01/15299, filed on Dec. 22, 2001.

(30) Foreign Application Priority Data

Jan. 13, 2001   (DE) ................................ 101 01 420

(51) Int. Cl.
*B23B 51/08* (2006.01)
*B23B 51/10* (2006.01)
(52) U.S. Cl. ...................... 408/118; 408/191; 408/224
(58) Field of Classification Search ............... 408/117, 408/118, 189, 191, 192, 197, 224, 225, 713
See application file for complete search history.

(56) References Cited

U.S. PATENT DOCUMENTS

| | | | | |
|---|---|---|---|---|
| 745,048 A | * | 11/1903 | Fuhrer | 408/146 |
| 1,267,704 A | * | 5/1918 | Skrukrud | 408/191 |
| 2,340,941 A | * | 2/1944 | Dietz | 408/191 |
| 2,372,719 A | * | 4/1945 | Freese | 408/224 |
| 2,661,642 A | | 12/1953 | Marcucci | |
| 2,667,795 A | * | 2/1954 | Bowen | 408/224 |
| 2,832,386 A | * | 4/1958 | Van Dalen | 408/193 |
| 3,063,312 A | * | 11/1962 | Mueller | 408/191 |
| 3,635,573 A | * | 1/1972 | Halpern | 408/186 |
| 3,794,438 A | * | 2/1974 | Knutsson | 408/231 |
| 4,076,443 A | * | 2/1978 | Halpern | 408/191 |
| 4,353,670 A | | 10/1982 | Jorgensen | |
| 4,580,933 A | * | 4/1986 | Wilkins | 408/118 |
| 4,655,650 A | * | 4/1987 | Crawford et al. | 408/225 |
| 5,915,895 A | * | 6/1999 | Jager et al. | 408/225 |
| 2002/0041798 A1 | * | 4/2002 | Karlsson | 408/118 |

(Continued)

FOREIGN PATENT DOCUMENTS

DE   7246625   12/1972

(Continued)

*Primary Examiner*—Boyer D. Ashley
*Assistant Examiner*—Michael W. Talbot
(74) *Attorney, Agent, or Firm*—Nils H. Ljungman & Associates

(57) ABSTRACT

A twist drill or drill/chamfer tool that comprises a drill with a shaft section. The shaft section is provided with a twisted flute and a clamping ring as the retainer of a facing cutter. The clamping ring tubularly encloses the shaft section or the drill shaft and can be fixed on the shaft section or drill shaft in different axial adjustable positions. The clamping ring can be tensioned on the drill with tension screws that extend through the clamping ring substantially radially to the axis of the drill. The tension screws impinge the surfaces of the twisted flutes, which twisted flutes are enclosed by the clamping ring indirectly with a clamping shoe that is interposed in a twisted flute.

20 Claims, 7 Drawing Sheets

U.S. PATENT DOCUMENTS

2003/0138302 A1 * 7/2003 Newmark .................. 408/119

FOREIGN PATENT DOCUMENTS

| | | | |
|---|---|---|---|
| DE | 2916947 A | * | 11/1979 |
| EP | 0687516 A1 | | 12/1995 |
| EP | 0647166 | | 8/1997 |
| FR | 2369775 | | 5/1978 |
| GB | 1378868 A | * | 12/1974 |
| GB | 1378869 A | * | 12/1974 |

* cited by examiner

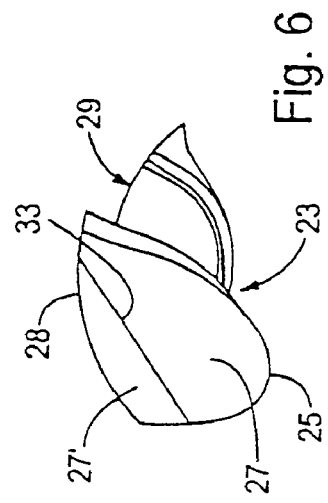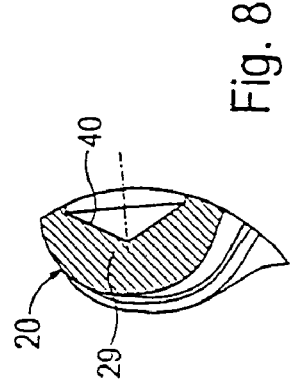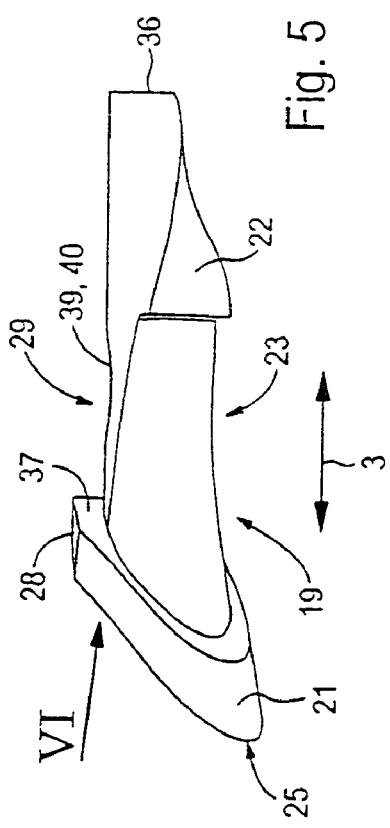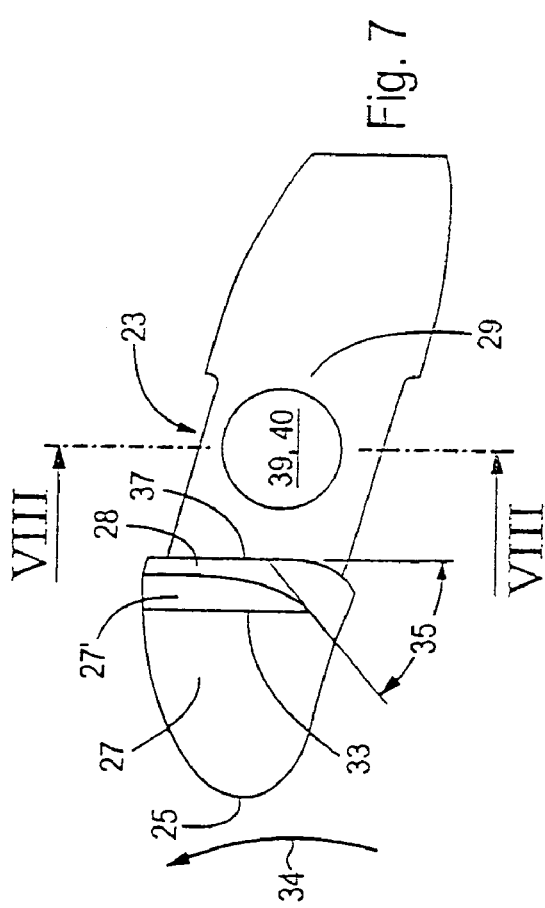

TWIST DRILL FOR DRILLING WITH A COUNTERSINK CUTTING ARRANGEMENT, AND A CUTTING TOOL WITH A COUNTERSINK CUTTING ARRANGEMENT, AND A CUTTING-CHAMFERING TOOL

CONTINUING APPLICATION DATA

This application is a Continuation-In-Part application of International Patent Application No. PCT/EP01/15299, filed on Dec. 22, 2001, which claims priority from Federal Republic of Germany Patent Application No. 101 01 420.1, filed on Jan. 13, 2001. International Patent Application No. PCT/EP01/15299 was pending as of the filing date of this application. The United States was an elected state in International Patent Application No. PCT/EP01/15299.

BACKGROUND OF THE INVENTION

1. Field of the Invention

The invention relates to a cutting-chamfering tool with a clamping ring that surrounds the spiral fluted shaft member of a drill on which the clamping ring can be mounted in any axial adjustment position as a holder for a countersink drill or a countersink cutter body.

2. Background Information

A tool of the type described above is described in DE-U-72 46 625 and comprises, in addition to a countersink body that surrounds the drill and is provided with a countersink cutter, a clamping element which also surrounds the drill and which can be screwed together with the latter in the axial direction of the drill. Said clamping element clamps the countersink body on the drill by means of balls that are adapted to and guided in the spiral flutes of the drill. This mounting arrangement is structurally complex.

Other solutions for mounting such a countersink body in any axial adjustment position are known from EP 0 687 516 A1 or EP 0 647 166 B1. Said devices clamp the countersink body indirectly by means of a clamping sleeve that is provided between the drill and the countersink body and that surrounds the drill. These solutions are also structurally complex.

OBJECT OF THE INVENTION

The object of the invention is to configure a simpler design for a cutting-chamfering tool of the above-described type.

SUMMARY OF THE INVENTION

The solution to the problem is a cutting-chamfering tool with a clamping ring that surrounds the spiral fluted shaft portion of a drill on which said clamping ring can be mounted in any axial adjustment position as a holder for a countersink drill or a countersink cutter body, where the clamping ring is braced, by means of a locking screw that penetrates it essentially radially, against the surfaces of the spiral flutes tunneled through by the clamping ring or which form tunnels with and run through the clamping ring, and a clamping shoe is positioned between the locking screw and the surface of a spiral flute. The clamping ring is braced against the surfaces of the spiral flutes, which are surrounded and tunneled through by the clamping ring, by means of a locking screw which penetrates the clamping ring essentially radially. Pressure is applied to the spiral flute by the clamping screw only indirectly by means of the interposition of a clamping shoe. The clamping shoe, which lies in the spiral flute, prevents the entrance of the chip into the cavity tunneled by or tunneling through the clamping ring, so that it occupies practically the entire volume of this cavity, or in any case most of the volume. In a further improvement, the clamping shoe projects in the direction toward the drill tip with a chip deflection end beyond the portion of the clamping ring that tunnels through or forms a tunnel with the respective spiral flute, and the clamping shoe prevents the chip from entering the cavity between the clamping ring and the surface of a spiral flute. In another particularly effective improvement, the chip deflection end of the clamping shoe overlaps at least the cross-section of the associated spiral flute, and a further improvement is possible in that the chip deflecting side of the clamping shoe forms the flank of a spacer rib acting relative to the clamping ring, which projects in the radial direction beyond the shaft of the clamping shoe tunneled through by the clamping ring or in the tunnel formed by the clamping ring, because said solutions make possible an improved chip deflection in the radial direction toward the outside.

Other following features serve to optimize the essentially radial removal of the chips from the spiral flutes to the outside, whereby a bend-like increase in the angular measurement of the chip deflector area is additionally able to generate a chip breaking effect. One such optimizing feature is that the chip deflecting surface of the chip deflecting end of the clamping shoe forms an acute angle with the bottom of the spiral flute, which angle opens from the drill bit toward the drill shaft. Another such optimizing feature is that the chip deflecting area is essentially flat in its area positioned within the spiral flute. Yet another such optimizing feature is an increase in the angular measurement on the side of the chip deflecting area facing the clamping ring which in the clamped position is positioned outside the spiral flute. Still another such optimizing feature is that the chip deflecting end at its side facing the clamping ring and projecting beyond the spiral flute and the counter-flank of the spacer rib, forms an acute angle, which closes in the direction of rotation of the drill.

Another feature is that the bearing surface of the clamping shoe has a recess in the form of a ring segment on or in the associated spiral flute between its chip deflecting end and its other end and maintains a radial distance to the wall surface of the spiral flute, which makes possible a slight elastic deflection of the shaft of the clamping shoe under the screw tension pressure that is exerted on it radially from the outside. This generates a reaction pressure that acts on the locking screw in the axial direction, which reaction pressure counteracts any loosening of the locking screw seat even under the effects of vibration.

While in one embodiment a pressure application surface for the locking screw that is provided in the surface of the clamping shoe that faces the engagement of the locking screw generates a pressure on the shaft 29 of the clamping shoe 19 or 20 in the axial direction of the locking screw 6, the embodiment that is characterized by a depression, the diameter of which tapers in the direction of the pressure, in particular a conical depression, provided in the surface of the clamping shoe that faces the engagement of the locking screw, also exerts a radial pressure component on the shaft 29 of the clamping shoe 19 or 20. This radial pressure component promotes contact between the surfaces of the shaft 29 of the clamping shoe 19 or 20 against the surface of the spiral flutes 9 or 10 respectively.

In one other possible embodiment of the present invention, the cutting tool can be a twist drill with at least one helical or helicoidal chip flute. The chip flute can follow a helical path approximately about the center longitudinal axis of the drill. The helical path of the chip flute may be either substantially symmetrical or substantially asymmetrical with respect to the center longitudinal axis of the drill.

A ring-shaped collar may be placed about the drill shaft and held to the drill shaft by a screw or other similar holding or clamping structure. In one other possible embodiment, the collar may be divided into spaced sections or pieces that hold the drill shaft but do not contact one another. In another possible embodiment, prong-like structures extending from a shank or chuck arrangement may possibly be held against the drill shaft instead of a collar.

Regardless of the design of the collar or other holding structure, the structure may be held to the drill shaft to hold a shoe insert structure. The shoe can have an elongated shape with a longitudinal axis running along the length of the shoe. This longitudinal axis runs essentially along the helical path of the chip flute upon insertion of the shoe into the chip flute. The shoe is inserted into a position between the drill shaft and the collar or ring upon installation of the shoe. Specifically, the shoe may be placed with a substantial portion thereof in a portion of the helical chip flute enclosed by the collar. Since the collar may be disposed about the drill shaft to substantially enclose a portion of the drill shaft, the collar consequently encloses a portion of the chip flute. This enclosed portion of the chip flute is like a tunnel running inside the collar. The shoe is dimensioned to fit and inserted to fill this tunnel-like opening preferably to essentially prevent entry of any chips produced during a cutting or drilling process.

The shoe may have a first end and a second end opposite the first end in the longitudinal direction. The first end may possibly be somewhat smaller in diameter than the second end. Each end may have a contoured surface designed to essentially match the contour of the interior of the chip flute to produce contact with a substantial portion of the interior surface of the chip flute. This substantial contact surface area between the shoe and the chip flute increases the resistance to undesired movement or displacement of the shoe. The contoured surfaces of the shoe may be substantially concave.

The second end may have an end face that runs substantially transverse to or at an angle with the longitudinal axis of the shoe. The end face, upon insertion and clamping of the shoe in the collar, is not enclosed by the collar, but rather extends out to essentially form a portion of the chip flute. The end face can have a curved or substantially flat surface that transitions either on a curve or at an angle into a chip deflecting area. The chip deflecting area transitions into a surface of the collar transverse to the longitudinal axis of the drill.

Between the first and second ends may be a central portion of the shoe that connects and forms a single structure with the first and second ends. This central portion may be somewhat smaller in diameter than the ends. In the central portion on the side facing away from the drill may be a receiving area designed to receive the clamping screw. During installation, the clamping screw could be inserted through the collar and into the receiving area to hold the shoe against unwanted displacement. In addition, the clamping screw can apply pressure on the central portion of the shoe. Since the central portion is preferably smaller in diameter than the first and second ends, the interior surface of the central portion is adjacent the drill but does not contact the drill. There is a slight elasticity and flexibility at the central portion of the shoe. As pressure is applied by the clamping screw, the central portion flexes toward the drill, thus producing increased clamping and holding action of the shoe against the flute at the contoured contact surfaces on the first and second ends.

In one other possible embodiment, the shoe may not necessarily be substantially elongated, but rather may be somewhat shorter in length than it is in width. In such an embodiment, the longitudinal axis of the shoe would run transverse to the helical axis of the chip flute and the longitudinal axis of the drill. The axis defined by the width of the shoe could be transverse to the longitudinal axis of the shoe and could run along the helical axis of the chip flute. The shoe could still be contoured and shaped similarly to the above-discussed embodiments.

In yet another possible embodiment, the flutes of the drill may possibly be substantially straight.

The above-discussed embodiments of the present invention will be described further hereinbelow. When the word "invention" is used in this specification, the word "invention" includes "inventions", that is the plural of "invention". By stating "invention", the Applicant does not in any way admit that the present application does not include more than one patentably and non-obviously distinct invention, and maintains that this application may include more than one patentably and non-obviously distinct invention. The Applicant hereby asserts that the disclosure of this application may include more than one invention, and, in the event that there is more than one invention, that these inventions may be patentable and non-obvious one with respect to the other.

BRIEF DESCRIPTION OF THE DRAWINGS

The invention will be explained below by means of the exemplary embodiments that are illustrated in the accompanying drawings, in which:

FIG. 5 is a perspective side view of a first embodiment of the clamping shoe.

FIG. 6 is a perspective front view in the direction of arrow VI in FIG. 5.

FIG. 7 is a perspective overhead view in the direction of arrow VII in FIG. 5.

FIG. 8 is a sectional view along line VIII—VIII in FIG. 7.

DESCRIPTION OF THE PREFERRED EMBODIMENT

Figure 1:
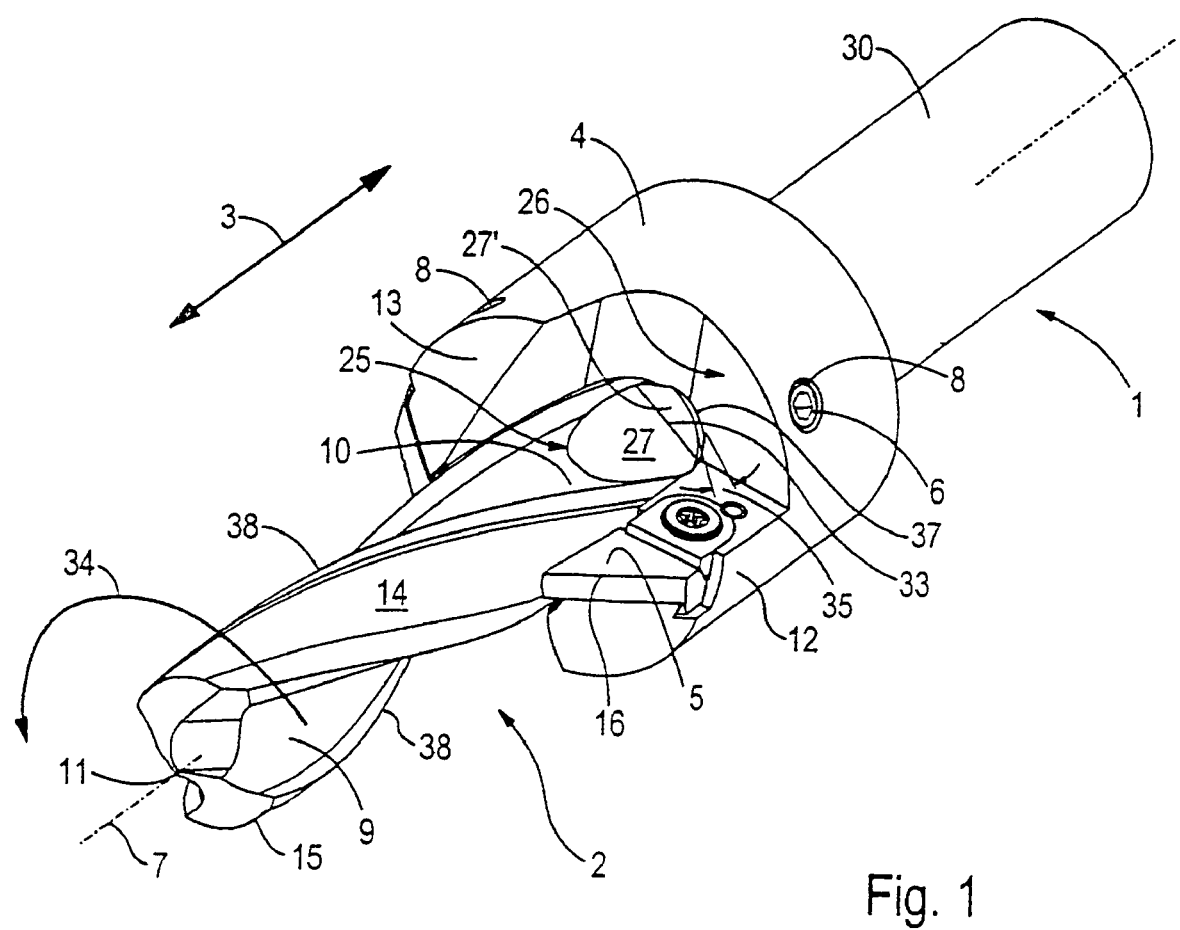
FIG. 1 is an overall perspective of the cutting-chamfering tool from the side of the drill bit.
Figure 2:
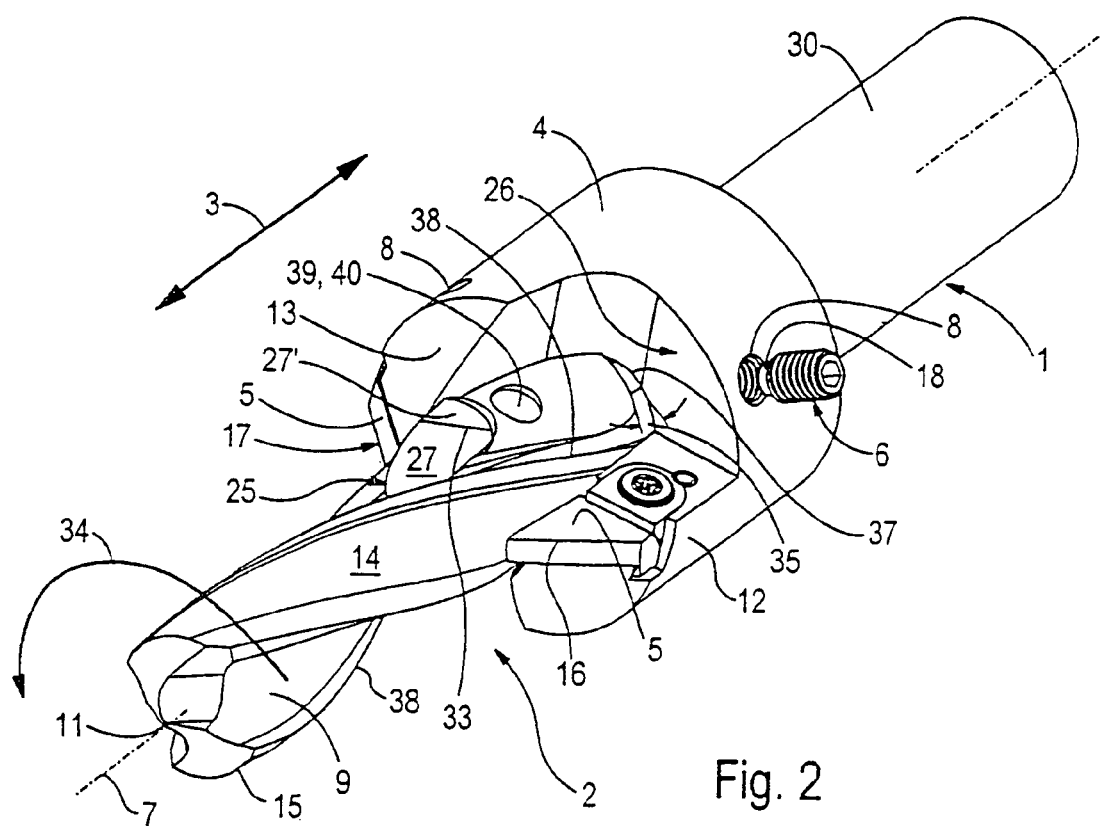
FIG. 2 is an exploded, modified illustration, analogous to FIG. 1, with a separate representation of a locking screw and its associated clamping shoe.
Figure 3:
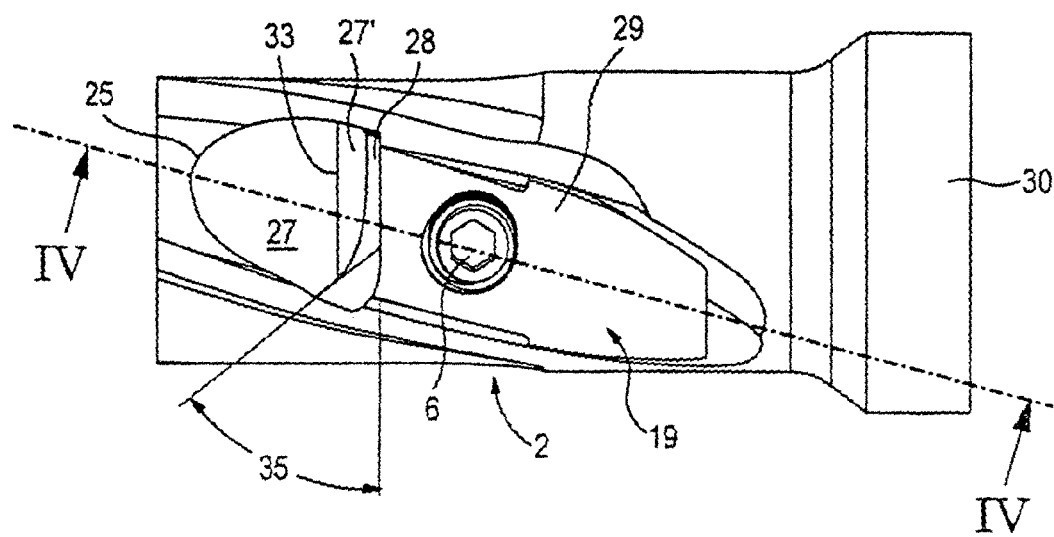
FIG. 3 is an overhead view of the front end of the drill with a clamping shoe provided in a spiral flute and with its associated locking screw. but not including the clamping ring.

The cutting-chamfering tool comprises a drill 1 with a spiral fluted shaft member 2 and a clamping ring 4 surrounding the shaft member 2 which clamping ring 4 can be mounted in any adjustment position in the axial direction 3 as a holder for a countersink cutter body 5. It carries at least one locking screw 6 that penetrates the clamping ring 4 essentially radially. The clamping ring 4, on its side opposite the drill bit 11, is configured in the shape of a hollow cylinder or tube and surrounds the drill 1, including its shaft portion 2, with a sliding seat.

Evenly distributed over the circumference of the clamping ring 4 are a number of essentially radial threaded bores 8 penetrating the clamping ring, one to receive each locking screw 6. Said number is equivalent to the number of spiral flutes 9, 10 on the drill 1. In the exemplary embodiment, there are two locking screws 6, each of which is designed for radially acting on one of the spiral flutes 9 or 10. With this, the clamping ring 4 can be clamped to the drill 1 in any desired axial position (axial direction 3).

The clamping ring 4 surrounds the drill 1 in the manner of a ring only in the area opposite the drill bit 11 where it tunnels through or forms tunnels with both spiral flutes 9, 10. From the clamping ring 4, the two holding projections 12, 13 project in the axial direction 3 toward the drill bit 11. Both holding projections 12, 13 touch the two drill flanks 14, 15 with their inside flanks. On their sides facing the drill bit 11 they each carry a countersink cutter body 5, which is in contact with the associated drill flank 14 or 15 and carries a countersink cutter 16 or 17.

A clamping shoe 19 is positioned between the pressure end 18 of each locking screw 6 and the surface of its associated spiral flute 9 or 10. The clamping shoe 19 in the embodiment as illustrated in FIGS. 5–8 and the clamping shoe 20 in the embodiment illustrated in FIGS. 9–12 are guided in their associated spiral flutes 9 and 10 respectively so as to be longitudinally adjustable in the axial direction 3. For this purpose, the clamping shoes 19, 20 on their sides facing the spiral flutes 9 or 10, have a convex surface configuration that ensures a controlled longitudinal shifting motion and represents approximately a positive relative to the concave cross-sectional shape formed by the spiral flutes 9, 10. The guide surfaces 21 and 22 of the embodiment illustrated in FIGS. 5–8, which are adapted to the cross-sectional shape of the spiral flutes 9, 10, are associated with the two ends of the clamping shoe 19 and said ends are separated from each other by means of a radial recess 23. In contrast, in the clamping shoe 20 (FIGS. 9–12) the guide surface 24 facing the spiral flute 9, 10 is configured as one piece. The guide surface 24 extends over the entire surface of the clamping shoe 20 facing the spiral flute 9 or 10.

With its side 25 facing the drill bit 11 in mounted position the clamping shoe 19, 20 projects over the part of the clamping ring 4 that tunnels through or forms tunnels with the respective spiral flute 9, 10, namely over the front side 26 of the clamping ring 4 that faces the drill bit 11. The end 25 of the clamping shoe 19 or 20 projecting over the front side 26 of the clamping ring 4 in the mounted position acts as a chip deflecting end with chip deflector areas 27, 27'. The chip deflecting end 25 overlaps at least the cross-section of the associated spiral flute 9, 10.

In the illustrated embodiments of a clamping shoe 19 and 20 the respective chip deflecting end 25 forms the flank that faces the drill bit 11 in the mounted position of a spacer rib 28 that acts relative to the clamping ring 4, which spacer rib 28 projects in the radial direction relative to the drill axis 7 beyond the shaft 29 of the clamping shoe 19 or 20 tunneled through by the clamping ring 4 or in the tunnels formed and enclosed by the clamping ring 4.

Figure 4:
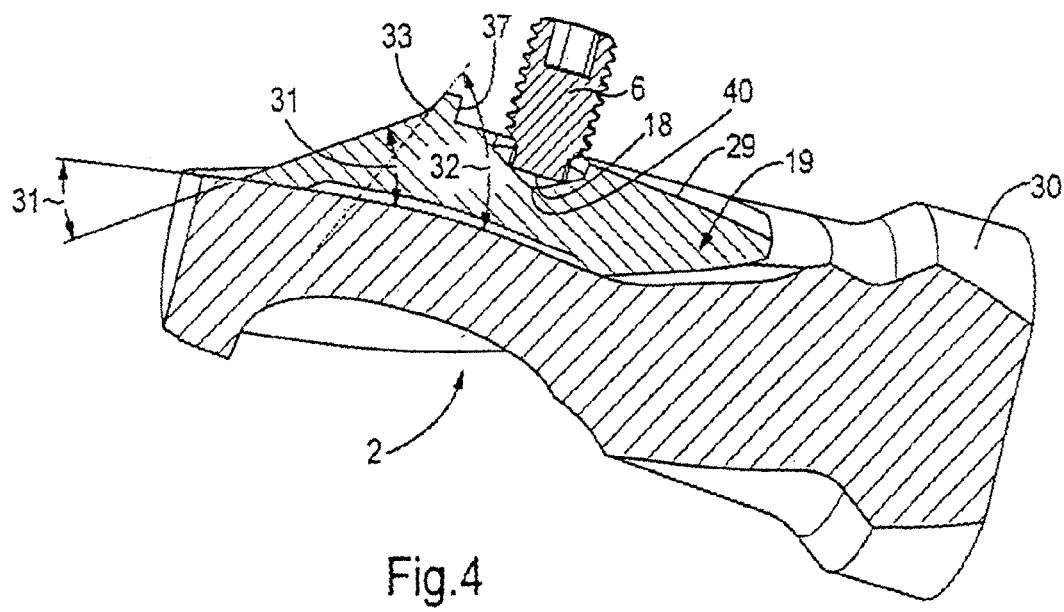
FIG. 4 is a section along line IV—IV in FIG. 3.

The chip deflector area 27 of the chip deflecting end 25 of the clamping shoe 19 and 20 essentially, i.e. especially in its area facing the drill bit 11, forms an acute angle 31 with the bottom of the spiral flute 9 or 10 which opens from the drill bit 11 to the drill shaft 30. The chip deflection area 27, in its area positioned within the spiral flute 9 or 10, is essentially flat. The acute angle 31 increases on the side of the chip deflection area 27 which faces the clamping ring 4 and which in clamped position is positioned outside the spiral flute 9 or 10, to an angle 32 (FIG. 4). The transition from angle 31 to angle 32 (FIG. 4) is configured in the form of a bend 33. The bend 33 forms approximately a straight line, but it can also be slightly curved.

The bent rear chip deflection area 27' of the clamping shoe 19, 20 opposite the bottom of the spiral flute 9, 10 and the counter-flank 37 of the spacer rib 28 facing the front side 26 of the clamping ring 4 form an acute angle 35 that closes in the direction of rotation 34 of the drill. As a result, the chip deflection area 27' serves as a chip deflection area which deflects the chips running off from the chip deflection area 27 not only radially toward the outside, but additionally in the direction of rotation 34 of the drill, away from the cutter 38 of a spiral flute 9 or 10. As a result, it additionally protects the cutter 38 of the spiral flute 9 or 10. The spacer rib 28 is supported with said counter flank 37 in the axial direction 3 by the front side 26 of the clamping ring 4 or it abuts on said front side 26.

On the surface of the shaft 29 of the clamping shoe 19, 20 on which the pressure side 18 of a locking screw 6 acts, there is a pressure-application surface 39 for the pressure end 18 of the locking screw 6. Said pressure application surface 39 is essentially flat.

In FIGS. 4 and 8, instead of a pressure application surface 39 for the application of pressure by the locking screw 6, there is a depression that tapers in diameter in the direction of the pressure. In the illustrated example it is a conical depression 40. This depression ensures contact between the surface of the shaft 29 of the clamping shoe 19 or 20 and the surface of the spiral flute 9 or 10 respectively. The application of pressure by the locking screw 6 of course causes not only an axial pressure, but also a radial pressure component on the shaft 29 of the clamping shoe 19 or 20.

Figure 3A:
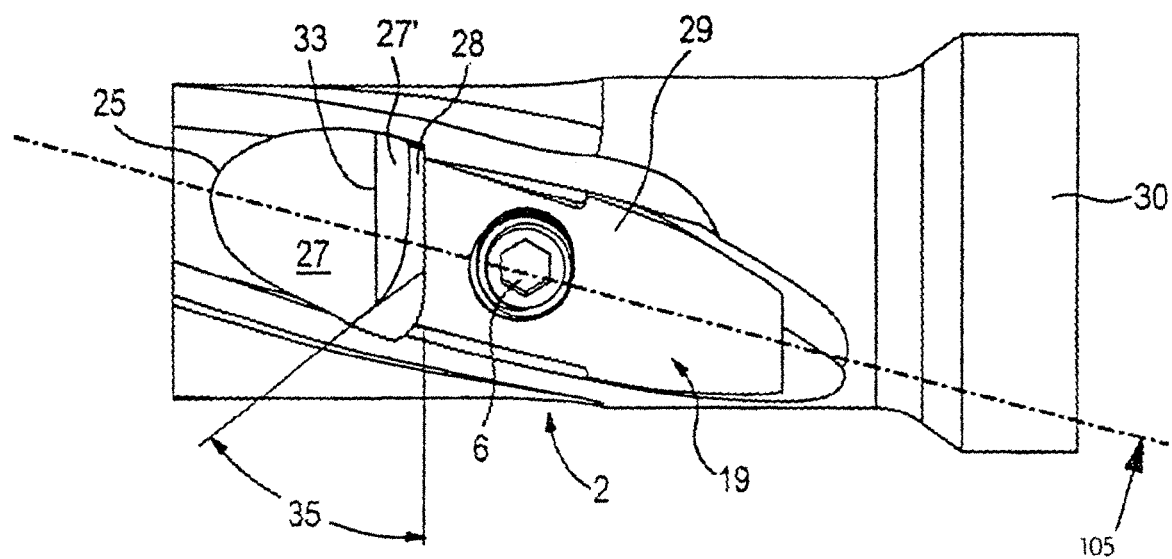
FIG. 3A is similar to FIG. 3, but shows a longitudinal axis of the clamping shoe.
Figure 10:
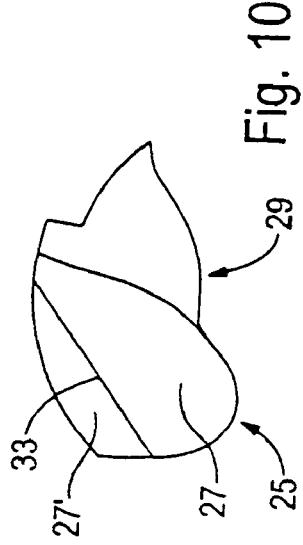
FIGS. 9–12 are representations of a second embodiment of the clamping shoe analogous to FIGS. 5–8.
Figure 12:
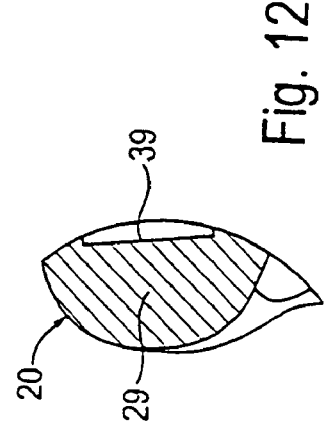
Figure 9:
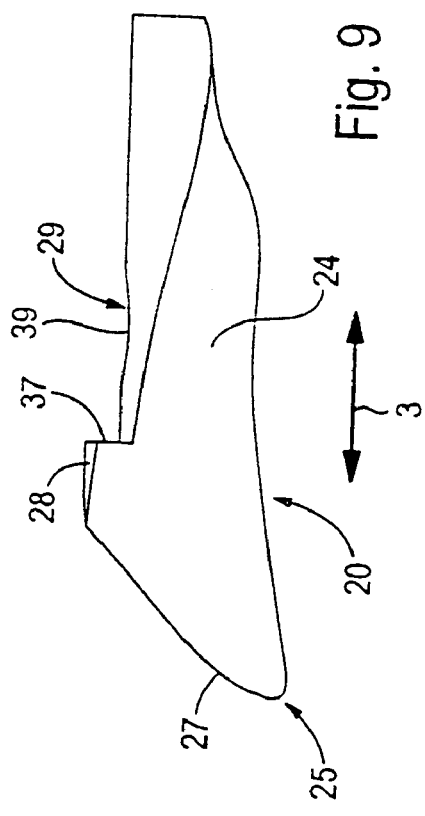
Figure 11:
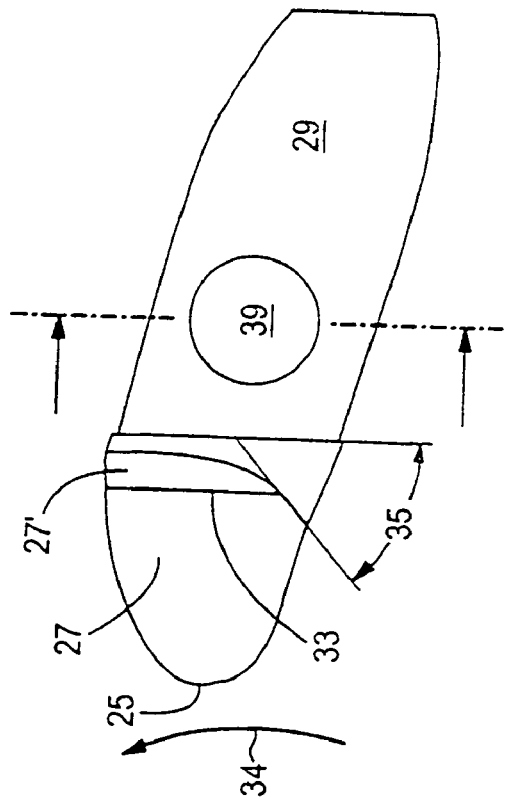
Figure 13:
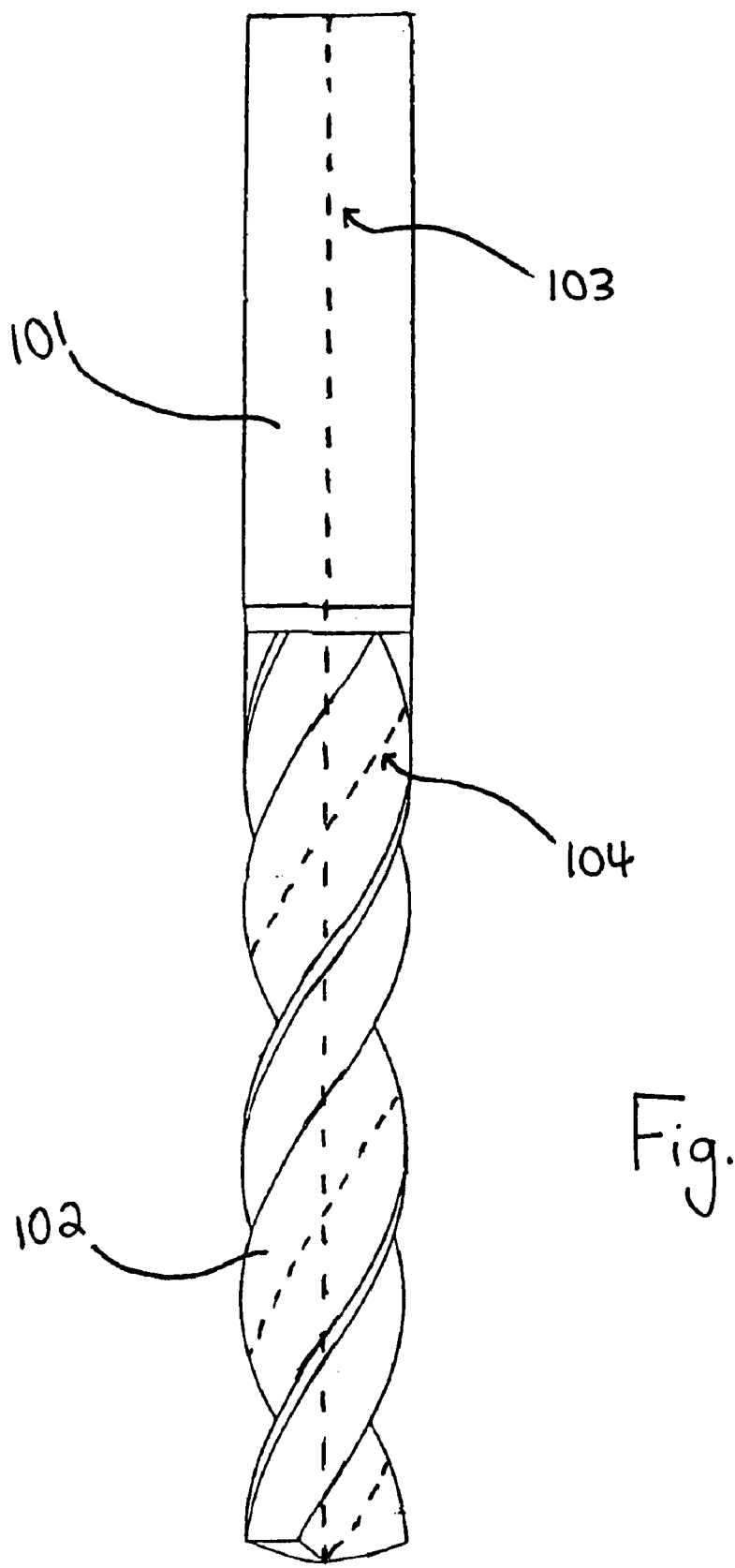
FIG. 13 shows a twist drill with a helical fluted portion.

FIG. 13 shows a twist drill having a drill shank 101 and a helical fluted portion 102. The drill has a central longitudinal axis 103 about which the flute surfaces of the fluted portion 102 run in a helical manner along a helical axis 104. FIG. 3A shows a view of the clamping shoe 19 positioned in the flute. The dotted line 105 shows the longitudinal axis of the clamping shoe 19, which runs along the helical axis of the flute, such as is shown in FIG. 13.

One feature of the invention resides broadly in a cutting-chamfering tool with a clamping ring (4) that surrounds the spiral fluted shaft portion (2) of a drill (1) on which said clamping ring (4) can be mounted in any axial adjustment position as a holder for a countersink drill or a countersink cutter body (5), where the clamping ring (4) is braced, by means of a locking screw (6) that penetrates it essentially radially, against the surfaces of the spiral flutes (9, 10) tunneled through by the clamping ring (4) or which form tunnels with and run through the clamping ring (4), and a clamping shoe (19, 20) is positioned between the locking screw (6) and the surface of a spiral flute (9, 10).

Another feature of the invention resides broadly in the cutting-chamfering tool, characterized by the fact that the clamping shoe (19, 20) projects in the direction toward the drill tip (11) with a chip deflection end (25) beyond the portion (26) of the clamping ring (4) that tunnels through or forms tunnels with the respective spiral flute (9, 10).

Yet another feature of the invention resides broadly in the cutting-chamfering tool, characterized by the fact that the chip deflection end of the clamping shoe (19, 20) overlaps at least the cross-section of the associated spiral flute (9, 10).

Still another feature of the invention resides broadly in the cutting-chamfering tool, characterized by the fact that the chip deflecting side (25) of the clamping shoe (19, 20) forms the flank of a spacer rib (28) acting relative to the clamping ring (4), which projects in the radial direction beyond the shaft (29) of the clamping shoe (19, 20) tunneled through by the clamping ring (4) or in the tunnels formed by the clamping ring (4).

A further feature of the invention resides broadly in the cutting-chamfering tool, characterized by the fact that the chip deflecting surface (27) of the chip deflecting end (25) of the clamping shoe (19,20) forms an acute angle (31) with the bottom of the spiral flute (9, 10) which angle opens from the drill bit (11) toward the drill shaft (30).

Another feature of the invention resides broadly in the cutting-chamfering tool, characterized by the fact that the chip deflecting area (27) is essentially flat in its area positioned within the spiral flute (9, 10).

Yet another feature of the invention resides broadly in the cutting-chamfering tool, characterized by an increase (33) in the angular measurement (31, 32) on the side of the chip deflecting area (27) facing the clamping ring (4) which in the clamped position is positioned outside the spiral flute (9, 10).

Still another feature of the invention resides broadly in the cutting-chamfering tool, characterized by a bend-like (33) increase in the angular measurement.

A further feature of the invention resides broadly in the cutting-chamfering tool, characterized by the fact that the chip deflecting end (27') at its side facing the clamping ring (4) and projecting beyond the spiral flute (9, 10) and the counter-flank (37) of the spacer rib (28), forms an acute angle (35), which closes in the direction of rotation (34) of the drill.

Another feature of the invention resides broadly in the cutting-chamfering tool, characterized by the fact that the bearing surface (21, 22) of the clamping shoe (19) has a recess in the form of a ring segment on or in the associated spiral flute (9, 10) between its chip deflecting end (25) and its other end (2) and maintains a radial distance to the wall surface of the spiral flute (9, 10).

Yet another feature of the invention resides broadly in the cutting-chamfering tool, characterized by a pressure application surface (39) for the locking screw (6) that is provided in the surface of the clamping shoe (19, 20) that faces the engagement of the locking screw (6).

Still another feature of the invention resides broadly in the cutting-chamfering tool, characterized by a depression, the diameter of which tapers in the direction of the pressure, in particular a conical depression (40), provided in the surface of the clamping shoe (19, 20) that faces the engagement of the locking screw (6).

The components disclosed in the various publications, disclosed or incorporated by reference herein, may be used in the embodiments of the present invention, as well as equivalents thereof.

The appended drawings in their entirety, including all dimensions, proportions and/or shapes in at least one embodiment of the invention, are accurate and are hereby included by reference into this specification.

Some examples of drills with countersink assemblies and parts thereof which may possibly be utilized or adapted for use in at least one possible embodiment of the present invention may possibly be found in the following U.S. Pat. No. 5,482,410, entitled "Drill and countersink assembly and method;" U.S. Pat. No. 5,161,921, entitled "Method and equipment designed to drill countersunk holes on surfaces in any position;" U.S. Pat. No. 4,551,045, entitled "Countersink core drill assembly and method of utilizing same;" and U.S. Pat. No. 4,093,395, entitled "Drill and combined drill countersink."

All, or substantially all, of the components and methods of the various embodiments may be used with at least one embodiment or all of the embodiments, if more than one embodiment is described herein.

All of the patents, patent applications and publications recited herein, and in the Declaration attached hereto, are hereby incorporated by reference as if set forth in their entirety herein.

Some examples of countersink assemblies and parts thereof which may possibly be utilized or adapted for use in at least one possible embodiment of the present invention may possibly be found in the following U.S. Pat. No. 5,328,305, entitled "Offset drive countersink apparatus;" U.S. Pat. No. 5,078,555, entitled "Tooling to form a countersink or counterbore;" U.S. Pat. No. 5,066,172, entitled "Countersink tool assembly;" U.S. Pat. No. 4,950,109, entitled "Milling and countersinking fixture;" U.S. Pat. No. 4,917,550, entitled "Countersink forming tooling;" U.S. Pat. No. 4,897,000, entitled "Clamping mechanism for an apparatus for drilling or countersinking holes in a workpiece;" U.S. Pat. No. 4,895,482, entitled "Countersink forming tooling;" U.S. Pat. No. 4,717,291, entitled "Automatic countersink depth control tool for fastener installer;" U.S. Pat. No. 4,591,302, entitled "Countersink with disposable insert;" U.S. Pat. No. 4,551,045, entitled "Countersink core drill assembly and method of utilizing same;" and U.S. Pat. No. 4,449,865, entitled "Method and tool for generating countersunk holes in composite materials."

All of the patents, patent applications or patent publications, which were cited in the International Search Report dated Jun. 24, 2002, and/or cited elsewhere are hereby incorporated by reference as if set forth in their entirety herein as follows: EP 0 647 166 B, issued Aug. 20, 1997; FR 2 369 775 A, issued May 26, 1978; U.S. Pat. No. 4,353,670 A, issued Oct. 12, 1982; and U.S. Pat. No. 2,661,642 A, issued Dec. 8, 1953.

The corresponding foreign and international patent publication applications, namely, Federal Republic of Germany Patent Application No. 101 01 420.1, filed on Jan. 13, 2001, having inventors Horst Jäger and Berthold Zeug, and DE-OS 101 01 420.1 and DE-PS 101 01 420.1, and International Application No. PCT/EP01/15299, filed on Dec. 22, 2001, having WIPO Publication No. WO02/055244 A1 and inventors Horst Jäger and Berthold Zeug, as well as their published equivalents, and other equivalents or corresponding applications, if any, in corresponding cases in Germany and elsewhere, and the references and documents cited in any of the documents cited herein, such as the patents, patent applications and publications, are hereby incorporated by reference as if set forth in their entirety herein.

Some examples of drills with cutters that may be utilized or adapted for use in at least one possible embodiment of the present invention may be found in the following U.S. Pat. No. 6,220,795 B1, issued to Matthews on Apr. 24, 2001; U.S. Pat. No. 6,213,691 B1, issued to Leeb on Apr. 10, 2001; U.S. Pat. No. 6,095,264, issued to Dillard on Aug. 1, 2000; U.S. Pat. No. 6,059,054, issued to Portwood et al. on May 9, 2000; U.S. Pat. No. 5,909,985, issued to Shiga et al. on Jun. 8, 1999; U.S. Pat. No. 5,518,077, issued to Blackman et al. on May 21, 1996; U.S. Pat. No. 5,161,898, issued to Drake on Nov. 10, 1992; U.S. Pat. No. 4,975,290, issued to Lindberg on Jan. 3, 1989; and U.S. Pat. No. 4,412,763, issued to Shallenberger, Jr. on Nov. 1, 1983.

All of the references and documents, cited in any of the documents cited herein, are hereby incorporated by reference as if set forth in their entirety herein. All of the documents cited herein, referred to in the immediately preceding sentence, include all of the patents, patent applications and publications cited anywhere in the present application.

Some examples of drills with reamers that may be utilized or adapted for use in at least one possible embodiment of the present invention may be found in the following U.S. Pat. No. 5,499,896, issued to Cafarelli on Mar. 19, 1996; U.S. Pat. No. 5,390,750, issued to Deken et al. on Feb. 21, 1995; U.S. Pat. No. 5,354,155, issued to Adams on Oct. 11, 1994; U.S. Pat. No. 4,815,899, issued to Regan on Mar. 28, 1989; U.S. Pat. No. 4,606,680 issued to Striegl on Aug. 19, 1986; U.S. Pat. No. 4,605,347, issued to Jodock et al. on Aug. 12, 1986; and U.S. Pat. No. 4,507,028, issued to Matsushita on Mar. 26, 1985.

The details in the patents, patent applications and publications may be considered to be incorporable, at applicant's option, into the claims during prosecution as further limitations in the claims to patentably distinguish any amended claims from any applied prior art.

The abstract of the disclosure is submitted herewith as required by 37 C.F.R. §1.72(b). As stated in 37 C.F.R. §1.72(b):

A brief abstract of the technical disclosure in the specification must commence on a separate sheet, preferably following the claims, under the heading "Abstract of the Disclosure." The purpose of the abstract is to enable the Patent and Trademark Office and the public generally to determine quickly from a cursory inspection the nature and gist of the technical disclosure. The abstract shall not be used for interpreting the scope of the claims.

Therefore, the abstract is not intended to limit the claims in any manner and should not be interpreted as limiting the claims in any manner.

The invention as described hereinabove in the context of the preferred embodiments is not to be taken as limited to all of the provided details thereof, since modifications and variations thereof may be made without departing from the spirit and scope of the invention.

What is claimed is:

1. A tool for drilling countersunk holes comprising:
a drill having a central longitudinal axis;
said drill comprising a fluted shaft portion comprising at least one flute;
a clamping ring comprising a countersinking arrangement;
said clamping ring being configured to be disposed to surround a part of said fluted shaft portion of said drill and to form at least one opening between said at least one flute and said clamping ring;
said clamping ring comprising at least one threaded hole being disposed through said clamping ring and being configured to be disposed essentially radially with respect to said longitudinal axis of said drill;
at least one clamping shoe being configured to be disposed in said at least one opening and adjacent said at least one threaded hole; and
at least one locking screw being configured to be screwed into and through said at least one threaded hole to contact said at least one clamping shoe to clamp said clamping shoe against said at least one flute and to clamp said clamping ring to said drill to permit countersinking of holes drilled by said tool.

2. The tool as claimed in claim 1, wherein:
said drill comprises a drill tip;
said clamping shoe comprises a chip deflecting end that projects in the direction toward said drill tip with a chip deflecting end and said clamping ring.

3. The tool as claimed in claim 2, wherein:
said chip deflecting end of said clamping shoe overlaps at least the cross-section of the respective spiral flute;
said clamping shoe comprises a shaft;
said chip deflecting end of said clamping shoe forms the flank of a spacer rib acting relative to said clamping ring; and
said spacer rib projects in the radial direction beyond said shaft of said clamping shoe.

4. The tool as claimed in claim 3, wherein:
said drill comprises a shaft portion;
said fluted shaft portion is disposed between said drill tip and said shaft portion;
said chip deflecting end comprises a chip deflecting surface;
said chip deflecting surface of said chip deflecting end of said clamping shoe forms an acute angle with the bottom of said spiral flute portion, which acute angle opens in the direction from said drill tip toward said shaft portion; and
said chip deflecting surface is essentially flat in its area positioned within said spiral flute.

5. The tool as claimed in claim 4, wherein the size of the acute angle increases its angular measurement at a bend adjacent said spacer rib on the side of said chip deflecting surface facing said clamping ring, which is positioned outside said spiral flute in the clamped position.

6. The tool as claimed in claim 5, wherein:
said clamping shoe comprises a bearing surface;
said spiral flutes comprise a wall surface;
said chip deflecting end, at its side facing said clamping ring and projecting beyond said spiral flute and the counter-flank of said spacer rib, forms an acute angle with a portion of said clamping ring adjacent said clamping shoe, which acute angle closes in the direction of rotation of said tool;
said bearing surface of said clamping shoe comprises a recess in the form of a ring segment on or in the corresponding spiral flute, between said chip deflecting end and said drill tip, and maintains a radial distance to the wall surface of said spiral flute; and
said clamping shoe comprises one of:
a pressure application surface for said locking screw that is disposed in said bearing surface of said clamping shoe and faces the engagement of said locking screw; and
a conical depression, comprising a diameter which tapers in the direction of pressure, that is provided in the surface of the clamping shoe and faces the engagement of said locking screw.

7. A tool for drilling countersunk holes comprising:
a drill having a central longitudinal axis;
said drill comprising a fluted shaft portion comprising at least one flute;
a clamping ring comprising a countersinking arrangement;
said clamping ring being configured and disposed to surround a part of said fluted shaft portion of said drill and to form at least one opening between said at least one flute and said clamping ring;

said clamping ring comprising at least one threaded hole being disposed through said clamping ring and being disposed essentially radially with respect to said longitudinal axis of said drill;

at least one clamping shoe being disposed in said at least one opening and being disposed adjacent said at least one threaded hole; and at least one locking screw being screwed into and through said at least one threaded hole and contacting said at least one clamping shoe to clamp said clamping shoe against said at least one flute and to clamp said clamping ring to said drill to permit countersinking of holes drilled by said tool.

8. The tool as claimed in claim 7, wherein:

said drill comprises a drill tip;

said clamping shoe comprises a chip deflecting end that projects in the direction toward said drill tip with a chip deflecting end and said clamping ring.

9. The tool as claimed in claim 8, wherein:

said chip deflecting end of said clamping shoe overlaps at least the cross-section of the respective spiral flute;

said clamping shoe comprises a shaft;

said chip deflecting end of said clamping shoe forms the flank of a spacer rib acting relative to said clamping ring; and said spacer rib projects in the radial direction beyond said shaft of said clamping shoe.

10. The tool as claimed in claim 9, wherein:

said drill comprises a shaft portion;

said fluted shaft portion is disposed between said drill tip and said shaft portion;

said chip deflecting end comprises a chip deflecting surface;

said chip deflecting surface of said chip deflecting end of said clamping shoe forms an acute angle with the bottom of said spiral flute portion, which acute angle opens in the direction from said drill tip toward said shaft portion; and said chip deflecting surface is essentially flat in its area positioned within said spiral flute.

11. The tool as claimed in claim 10, wherein the size of the acute angle increases its angular measurement at a bend adjacent said spacer rib on the side of said chip deflecting surface facing said clamping ring, which is positioned outside said spiral flute in the clamped position.

12. The tool as claimed in claim 11, wherein:

said clamping shoe comprises a bearing surface;

said spiral flutes comprise a wall surface;

said chip deflecting end, at its side facing said clamping ring and projecting beyond said spiral flute and the counter-flank of said spacer rib, forms an acute angle with a portion of said clamping ring adjacent said clamping shoe, which acute angle closes in the direction of rotation of said tool;

said bearing surface of said clamping shoe comprises a recess in the form of a ring segment on or in the corresponding spiral flute, between said chip deflecting end and said drill tip, and maintains a radial distance to the wall surface of said spiral flute; and said clamping shoe comprises one of:

a pressure application surface for said locking screw that is disposed in said bearing surface of said clamping shoe and faces the engagement of said locking screw; and a conical depression, comprising a diameter which tapers in the direction of pressure, that is provided in the surface of the clamping shoe and faces the engagement of said locking screw.

13. A twist drill arrangement for drilling countersunk holes comprising:

a twist drill having a central longitudinal axis;

said twist drill comprising a fluted shaft portion comprising at least one flute;

a clamping ring comprising a countersinking arrangement;

said clamping ring being configured and disposed to surround a part of said fluted shaft portion of said twist drill and to form at least one opening between said at least one flute and said clamping ring;

said clamping ring comprising at least one threaded hole being disposed through said clamping ring and being disposed essentially radially with respect to said longitudinal axis of said twist drill;

at least one clamping shoe being disposed in said at least one opening and being disposed adjacent said at least one threaded hole; and at least one locking screw being screwed into and through said at least one threaded hole and contacting said at least one clamping shoe to clamp said clamping shoe against said at least one flute and to clamp said clamping ring to said twist drill to permit countersinking of holes drilled by said twist drill arrangement.

14. The twist drill arrangement as claimed in claim 13, wherein:

said twist drill comprises a drill tip;

said clamping shoe comprises a chip deflecting end that projects in the direction toward said drill tip with a chip deflecting end and said clamping ring.

15. The twist drill arrangement as claimed in claim 14, wherein said chip deflecting end of said clamping shoe overlaps at least the cross-section of the respective spiral flute.

16. The twist drill arrangement as claimed in claim 15, wherein:

said clamping shoe comprises a shaft;

said chip deflecting end of said clamping shoe forms the flank of a spacer rib acting relative to said clamping ring; and said spacer rib projects in the radial direction beyond said shaft of said clamping shoe.

17. The twist drill arrangement as claimed in claim 16, wherein:

said twist drill comprises a shaft portion;

said fluted shaft portion is disposed between said drill tip and said shaft portion;

said chip deflecting end comprises a chip deflecting surface;

said chip deflecting surface of said chip deflecting end of said clamping shoe forms an acute angle with the bottom of said spiral flute portion, which acute angle opens in the direction from said drill tip toward said shaft portion.

18. The twist drill arrangement as claimed in claim 17, wherein said chip deflecting surface is essentially flat in its area positioned within said spiral flute.

19. The twist drill arrangement as claimed in claim 18, wherein the size of the acute angle increases its angular measurement at a bend adjacent said spacer rib on the side of said chip deflecting surface facing said clamping ring, which is positioned outside said spiral flute in the clamped position.

20. The twist drill arrangement as claimed in claim 19, wherein:
- said clamping shoe comprises a bearing surface;
- said spiral flutes comprise a wall surface;
- said chip deflecting end, at its side facing said clamping ring and projecting beyond said spiral flute and the counter-flank of said spacer rib, forms an acute angle with a portion of said clamping ring adjacent said clamping shoe, which acute angle closes in the direction of rotation of said tool;
- said bearing surface of said clamping shoe comprises a recess in the form of a ring segment on or in the corresponding spiral flute, between said chip deflecting end and said drill tip, and maintains a radial distance to the wall surface of said spiral flute; and said clamping shoe comprises one of:
- a pressure application surface for said locking screw that is disposed in said bearing surface of said clamping shoe and faces the engagement of said locking screw; and
- a conical depression, comprising a diameter which tapers in the direction of pressure, that is provided in the surface of the clamping shoe and faces the engagement of said locking screw.

\* \* \* \* \*